United States Patent [19]

Falk et al.

[11] Patent Number: 4,860,279
[45] Date of Patent: Aug. 22, 1989

[54] SOURCE MODULATED COHERENCE MULTIPLEXED OPTICAL SIGNAL TRANSMISSION SYSTEM

[75] Inventors: R. Aaron Falk, Renton; Jeffrey O. Coleman, Medina, both of Wash.

[73] Assignee: The Boeing Company, Seattle, Wash.

[21] Appl. No.: 278,613

[22] Filed: Nov. 30, 1988

[51] Int. Cl.⁴ .............................................. H04B 9/00
[52] U.S. Cl. ...................................... 370/1; 455/617; 455/612; 350/96.14
[58] Field of Search ............... 455/600, 610, 612, 617, 455/618, 619; 370/1, 3; 350/96.12, 96.13, 96.14; 356/345

[56] References Cited

U.S. PATENT DOCUMENTS

| | | |
|---|---|---|
| 4,175,827 | 11/1979 | McMahon . |
| 4,223,977 | 9/1980 | Papuchon et al. ............... 350/96.12 |
| 4,232,385 | 11/1980 | Hara et al. . |
| 4,502,037 | 2/1985 | Le Parquier et al. ............ 350/96.14 |
| 4,579,417 | 4/1986 | Ih . |
| 4,592,043 | 5/1986 | Williams . |
| 4,690,489 | 9/1987 | Neyer . |
| 4,799,797 | 1/1989 | Huggins ........................... 350/96.14 |

Primary Examiner—Robert L. Griffin
Assistant Examiner—Andrew J. Telesz, Jr.
Attorney, Agent, or Firm—Christensen, O'Connor, Johnson & Kindness

[57] ABSTRACT

A coherence multiplexed optical signal transmission system in which modulation is introduced into the system by modulating the optical carrier or source signal, rather than by modulating the optical path length of an interferometer arm. The system comprises a transmitter and receiver interconnected by an optical bus. The transmitter comprises a plurality of transmitter interferometers, each transmitter interferometer including a modulated optical source. The transmitter interferometers have optical path length differences that are greater than the coherence length of the associated source, and that differ from one another by an amount greater than the source coherence length. The receiver comprises a plurality of receiver interferometers having path length differences matching those of the transmitter interferometers. Multiplexing and demultiplexing means are provided for coupling optical radiation between the bus and the interferometers. A detection system is provided that includes an output terminal associated with each receiver interferometer. For each receiver interferometer, an output signal is produced at the associated output terminal when the optical radiation coupled into the receiver interferometer includes a component that has passed through a transmitter interferometer having an output path length difference equal to the optical path length difference of the receiver interferometer, to within the coherence length of the associated source.

5 Claims, 4 Drawing Sheets

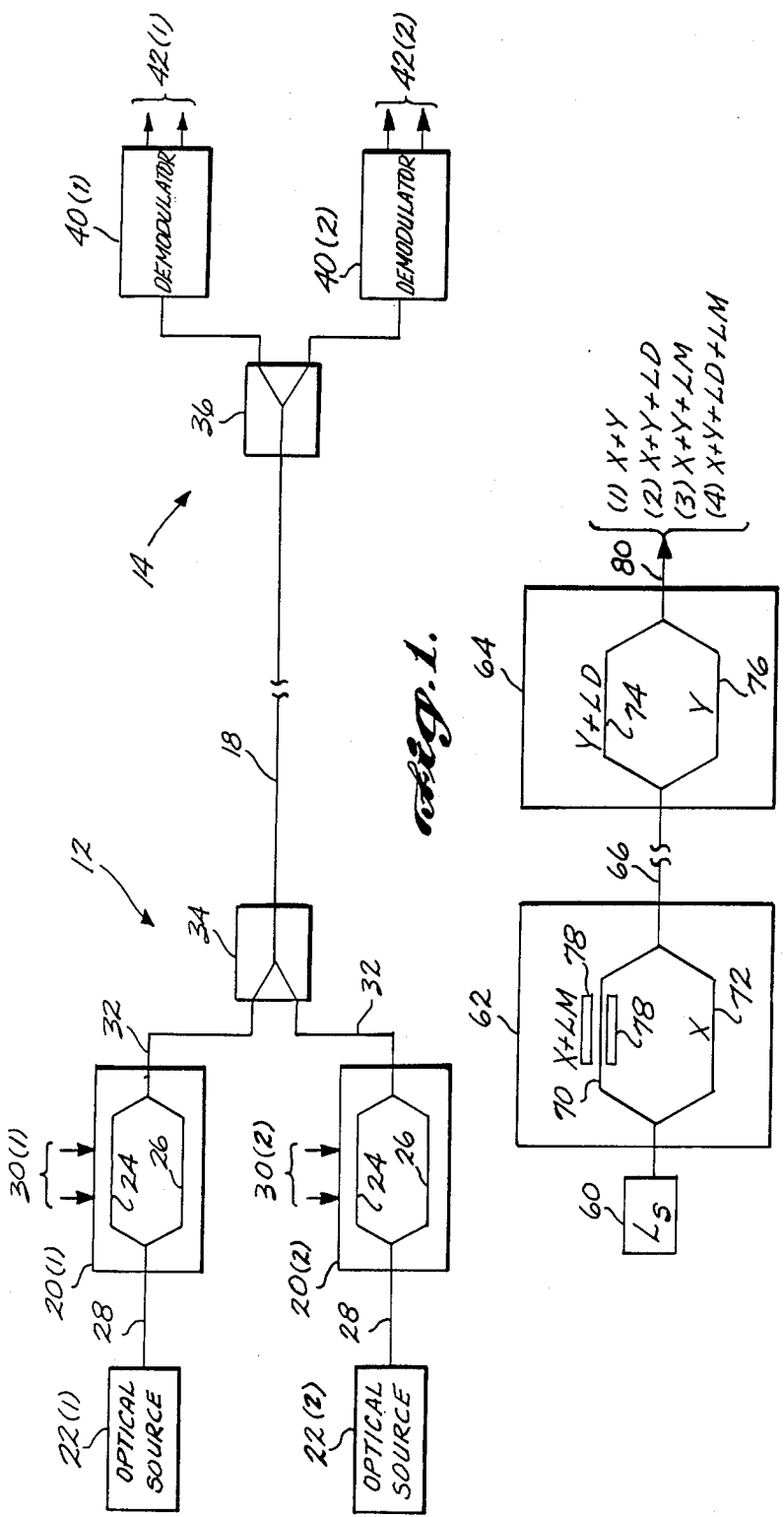

SOURCE MODULATED COHERENCE MULTIPLEXED OPTICAL SIGNAL TRANSMISSION SYSTEM

FIELD OF THE INVENTION

The present invention relates to optical signal transmission systems and, in particular, to an improved technique for producing a coherence multiplexed system in which a plurality of optical signals are multiplexed onto a common optical bus.

BACKGROUND OF THE INVENTION

In recent years, fiber-optic cables have been increasingly used for communications, particularly in telephone systems. Reasons for this increased usage include the facts that optical fibers are lighter in weight and less expensive than electrical conductors for the same information capacity, and are not subject to electrical interference. Typically, a communication system includes a light source such as a laser diode or an LED, and a photodetector such as a photodiode, connected through a single mode of multimode fiber-optic cable. Information is typically transmitted in digital form, as a series of light pulses that form a bit stream.

In order to increase the information-carrying capacity of a fiber-optic cable, frequency and time division multiplexing techniques have been widely explored. Examples of prior art frequency division multiplexing optical communication systems are described in U.S. Pat. Nos. 4,326,243 and 4,592,043. However, a number of problems have been encountered in implementing such systems. These problems include frequency variations of the semiconductor light sources, matching of the multiplexer and demultiplexer coupling frequencies, and the need for relatively large channel spacing to accommodate aging effects and manufacturing tolerances of semiconductor lasers.

Coherence multiplexing is a comparatively new technique for carrying multiple data channels on a single optical fiber or waveguide. In a coherence multiplexed system, the transmitted information is carried in the values of the complex autocorrelation or self-coherence function of the transmitted optical signal at time delays that represent data channels. The advantages of coherence multiplexing are that it uses optical signal processing structures that are inherently simpler than those required for frequency division multiplexing, and uses electronic signal processing structures that are simpler than those generally associated with time division multiplexing.

SUMMARY OF THE INVENTION

The present invention provides a coherence multiplexed optical signal transmission system in which modulation is introduced into the system by modulating the optical carrier or source signal, rather than by modulating the optical path length of an interferometer arm.

In a preferred embodiment, the signal transmission system comprises an optical bus and a plurality of optical sources, one source for each data transmission channel. Each source has a coherence length, and includes means for generating an optical input signal and means for modulating the amplitude of the input signal. The system also includes a plurality of transmitter interferometers, one associated with each optical source. Each transmitter interferometer has first and second transmitter arms that have an optical path length difference between them, each transmitter interferometer also including means for coupling optical radiation from the associated source into the arms. The optical path length difference is greater than the coherence length of the associated source, and different from the optical path length differences of all other transmitter interferometers by an amount greater than the coherence length of each source. Multiplexing means are provided for receiving optical radiation from the transmitter arms of the transmitter interferometers, and for combining the optical radiation onto the bus.

On the receiving end of the system, a plurality of receiver interferometers are provided, one for each channel, each having first and second receiver arms that have an optical path length difference between them. The optical path length difference between the receiver arms of each receiver interferometer is equal to the optical path length difference of an associated transmitter interferometer, to within the coherence length of the associated source. Demultiplexing means are provided for coupling optical radiation from the bus into both arms of each receiver interferometer. Finally, the system includes detection means coupled to each receiver interferometer. The detection means comprises an output terminal associated with each receiver interferometer, and means for producing, for each receiver interferometer, an output signal at the associated output terminal when the optical radiation coupled into the receiver interferometer includes a component that has passed through a transmitter interferometer having an optical path length difference equal to the optical path length difference of the receiver interferometer, to within the coherence length of the associated source.

In one preferred embodiment, the detection means comprises coupling means and signal processing means associated with each receiver interferometer. Each coupling means comprises a pair of input ports for receiving a pair of first signals, a pair of output ports for producing a pair of second signals, and means for producing second signals of different optical powers only when a component of one of the first signals is coherent with respect to a component of the other first signal. Each coupling means has its input port connected to the first and second receiver arms of the associated receiver interferometer. Each signal processing means comprises first and second photodetectors connected to receive optical radiation from the first and second output ports of the associated coupling means. The first and second photodetectors produce corresponding first and second photodetector signals. The signal processing means further comprises differencing means for producing an output signal on the associated output terminal corresponding to the difference between the first and second photodetector signals.

In a second preferred embodiment, the detection means comprises a photodetector associated with each receiver interferometer, each photodetector including means for producing an electrical photodetector signal. The detection means also comprises means for coupling optical radiation from the receiver arms to the photodetector, reference means for providing a reference signal equal to the sum of the photodetector signals scaled by $2/(2N+1)$, N being the number of channels, and differencing means electrically coupled to each photodetector. The differencing means produces an output signal on the associated output terminal proportional to the difference between the photodetector signal and the reference signal.

BRIEF DESCRIPTION OF THE DRAWINGS

FIG. 1 is a schematic diagram showing a multiplexed optical data transmission system;

FIG. 2 is a schematic diagram illustrating the phase modulation technique utilized in connection with the system shown in FIG. 1;

DETAILED DESCRIPTION OF THE INVENTION

Figure 3:
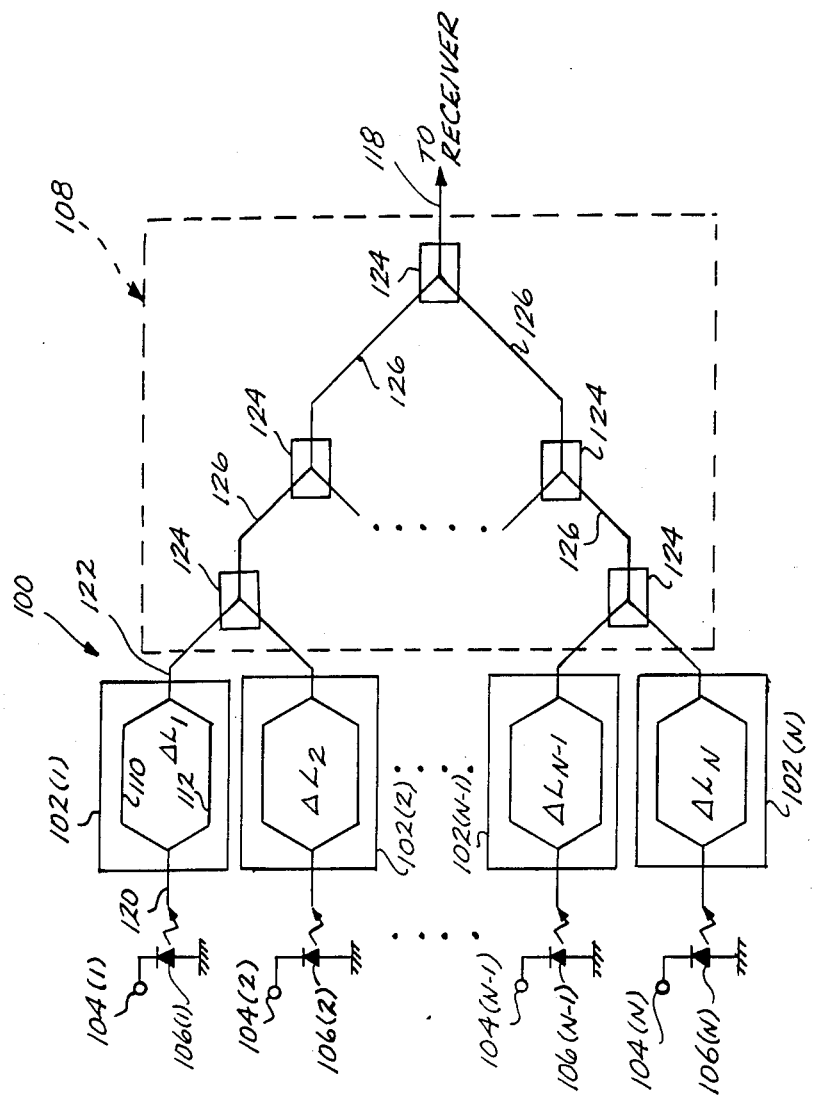
FIG. 3 is a schematic diagram of a preferred embodiment of the transmitter.

FIG. 1 illustrates a coherence multiplexed optical signal transmission system of the general type described in U.S. patent application entitled "Demodulator For Optical Data Transmission System", Ser. No. 222,960, filed July 22, 1988. The signal transmission system includes transmitter 12, receiver 14, and an optical bus comprising single mode fiber-optic cable 18. A two channel system is illustrated, although a larger number of channels could naturally also be used. Transmitter 12 comprises two modulators 20(1) and 20(2), each of which is coupled to fiber-optic cable 18. Each modulator 20 receives an optical carrier signal from a respective one of optical sources 22(1) and 22(2), and also receives an electrical modulation signal from a respective one of input channels 30(1) and 30(2), each input channel carrying a time varying electrical signal representing a serial data stream. Each modulator 20 modulates the optical carrier signal from its respective optical source in accordance with the data on its respective input channel, and the modulated carrier signals are multiplexed onto fiber-optic cable 18 via coupler 34.

The optical signal on fiber-optic cable 18 is received by receiver 14, and divided between demodulators 40(1) and 40(2) by power splitter 36. Each demodulator detects the signal from an associated one of the modulators, by a technique described below, and produces an electrical output signal on the associated one of output channels 42(1) and 42(2). Each electrical output signal corresponds to the electrical modulation signal on the associated one of the input channels.

In the illustrated embodiment, each modulator 20 comprises an unequal arm-length Mach-Zehnder interferometer that includes a modulated arm 24 and a reference arm 26. Each arm preferably comprises a single mode optical waveguide formed in a suitable electro-optic substrate such as lithium niobate. The modulated and reference arms of each modulator 20 are coupled to the associated optical source 22 by input waveguide 28, and the optical carrier signal produced by the optical source is divided evenly between both arms of the modulator. The radiation that passes through these two arms is combined onto output waveguide 32 that is in turn coupled to fiber-optic cable 18 by coupler 34. Each modulator 20 is connected to the electrical signal lines that form the associated input channel. As the signal on the input channel varies, the effective optical path length through modulated arm 24 also varies, thereby phase modulating that portion of the carrier signal that passes through the modulated arm. An example of a modulator of this general type is shown in U.S. Pat. No. 4,340,272.

The coherence multiplexing technique used in the optical transmission system of FIG. 1 is based upon the phase modulation of the optical carriers within transmitter 12, and the subsequent detection of that phase modulation by receiver 14. The phase modulation technique can be described with reference to the simplified, nonmultiplexed system shown in FIG. 2, comprising optical source 60, modulator 62, demodulator 64, and single mode fiber-optic cable 66. Modulator 62 comprises an unequal arm-length Mach-Zehnder interferometer that includes modulated arm 70 and reference arm 72, and demodulator 64 comprises an unequal arm-length Mach Zehnder interferometer that includes first arm 74, second arm 76, output waveguide 80, and a photodetector (not shown) coupled to output waveguide 80. Modulator 62 is fabricated in an electro-optic substrate, and electrodes 78 are positioned adjacent to modulated arm 70 and connected to the associated input channel to receive an electrical modulation signal. Modulator 62 is constructed such that in the absence of an electrical modulation signal, there exists an optical path length difference LM between modulated arm 70 and reference arm 72. Thus the lengths of the modulated and reference arms can be designated X+LM and X, respectively. Demodulator 64 is constructed such that arms 74 and 76 have a path length difference of LD, and the optical path lengths of the first and second arms can therefore be designated Y+LD and Y. Path length differences LD and LM are both greater than the coherence length of source 60, and are made to be approximately equal to one another. In particular, the difference between LD and LM is made less than the coherence length $L_s$ of optical source 60.

As a result of the described arrangement, the optical signal produced on output waveguide 80 includes radiation that has traveled four different paths. Ignoring the common path lengths in the interconnecting cables or waveguides, these path lengths are:

(1) X+Y
(2) X+Y+LD
(3) X+Y+LM
(4) X+Y+LM+LD

Minute variations in the length LM by a variation of the electrical modulation signal on the input channel effectively result in phase modulation of the radiation that has traveled the optical path of length X+Y+LM. The radiation that has traveled the optical path X+Y+LD is unmodulated but, having traveled the same optical path length to within a coherence length of the optical source, is coherent with the modulated radiation. It can therefore serve as a reference carrier for demodulation. Demodulation takes place when these two signals are mixed in a photodiode, a square-law device. The optical signals that have traveled over the paths of lengths X+Y and X+Y+LM+LD contribute only noise to the detection process.

The operation of the system of FIG. 2 can be viewed in another way. Because lengths LM and LD are matched to within a coherence length of the optical source, radiation that has traveled the optical path of length X+Y+LD will interfere with radiation that has traveled the optical path of length X+Y+LM. Such interference may be constructive or destructive, depending on the difference between the values LM and LD. Therefore, modulation of the value LM by variation of the electrical modulation signal on the input channel will produce intensity modulation of the optical signal on output waveguide 80. This optical signal may be converted into an electrical signal by a photodetector, and the photodetector output thereby varies in accordance with the electrical input signal to modulator 62.

Figure 4:
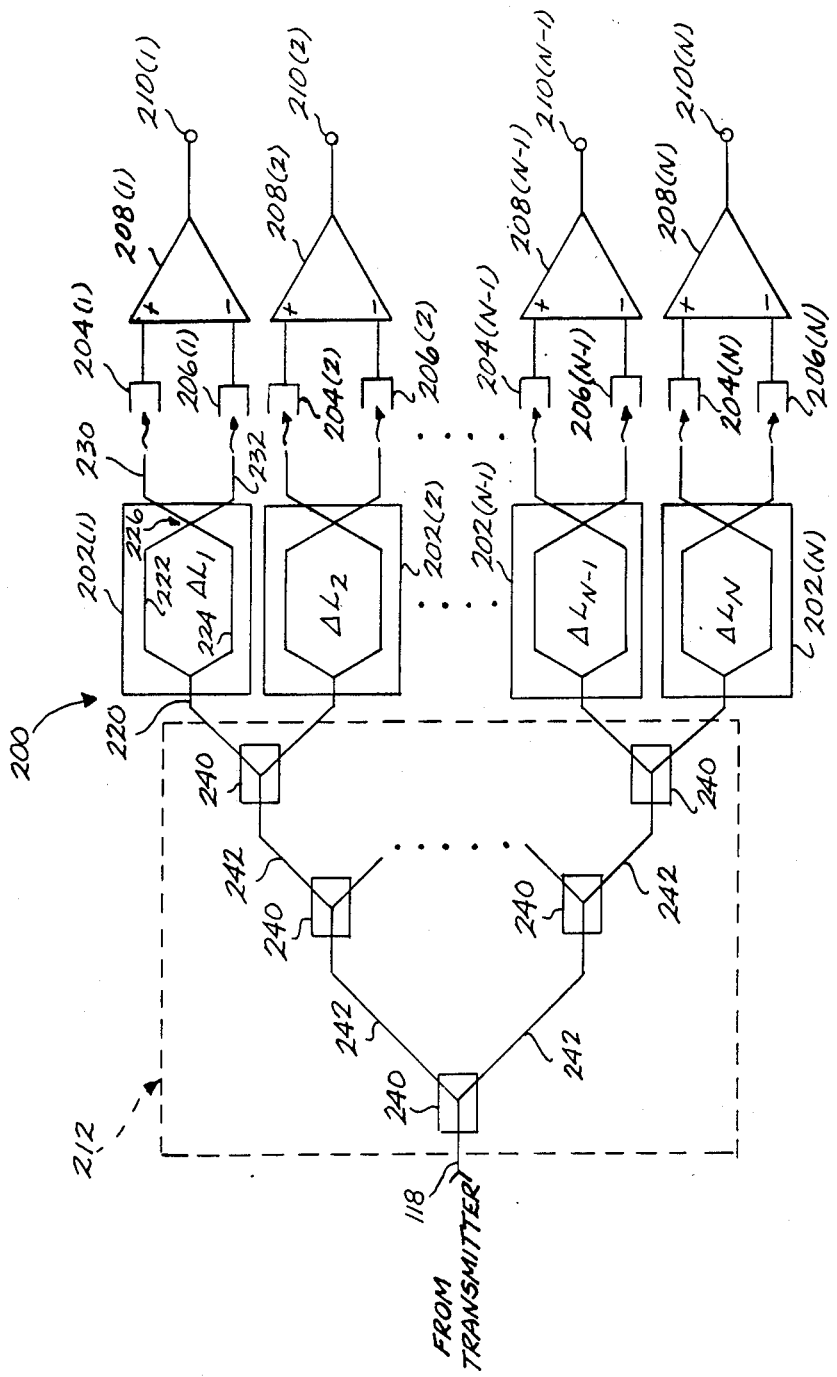
FIG. 4 is a schematic diagram of one preferred embodiment of the receiver.

The present invention provides a coherence multiplexed system in which the modulation is introduced in the transmitter by turning the optical sources on and off, or by otherwise varying the intensities of the optical sources, rather than by varying the optical path length of one arm of an interferometer. A preferred embodiment of an N channel system of the present invention is set forth in FIGS. 3 and 4, with FIG. 3 showing the transmitter and FIG. 4 showing the receiver. Referring initially to FIG. 3, transmitter 100 comprises N unequal arm length Mach-Zehnder interferometers 102(1)-102(N), corresponding input terminals 104(1)-104(N) and optical sources 106(1)-106(N), and signal multiplexer 108. Each interferometer 102 includes first arm 110 and second arm 112 that have different optical path lengths, the optical path length differences of interferometers 102(1)-102(N) being designated $\Delta L_1 - \Delta L_N$ respectively. The path length differences $\Delta L$ are selected such that each path length difference is greater than the coherence length of the associated optical source, and such that the path length differences differ from one another by an amount greater than the source coherence lengths. Each interferometer 102 includes an input waveguide 120 and an output waveguide 122. Each optical source 106, shown as a photodiode, is coupled to its corresponding input terminal 104, and is positioned so as to emit light into input waveguide 120 when an electrical input signal is applied to the input terminal.

Signal multiplexer 108 comprises a binary tree structure comprising a plurality of 2:1 Y couplers 124 interconnected by waveguides 126. Each coupler 124 receives an optical signal from two receiver interferometers or from two "upstream" couplers, and combines the signals to produce a single output signal which is passed to the next coupler, or to fiber optic cable 118 in the case of the rightmost coupler 124 shown in FIG. 3.

A preferred embodiment of receiver 200 is shown in FIG. 4. The receiver comprises N unequal arm length Mach-Zehnder interferometers 202(1)-202(N), each receiver interferometer having associated with it a pair of photodetectors 204 and 206, a differential amplifier 208, and an output terminal 210. The receiver also includes signal demultiplexer 212 connected between fiber-optic cable 118 and interferometers 202. The signal demultiplexer comprises a binary tree structure comprising 1:2 power splitters 240 interconnected by optical waveguides 242. Each interferometer 202 comprises input waveguide 220, and first and second arms 222 and 224. Associated with each receiver interferometer is X-coupler 226 that connects arms 222 and 224 to a pair of output waveguides 230 and 232. Light emerging from output waveguides 230 and 232 impinges on respective photodetectors 204 and 206, and the photodetectors are in turn connected to the noninverting and inverting inputs respectively of the associated differential amplifier 208. The output of the differential amplifier is coupled to output terminal 210. Interferometers 202 are constructed such that their path length differences are equal to $\Delta L_1 - \Delta L_N$, i.e., the path length differences of the receiver interferometers 202 mare made equal to the respective path length differences of the transmitter interferometers 102 shown in FIG. 3, to within the coherence lengths of the associated optical sources.

Receiver interferometers 202 and the associated X-couplers, photodetectors and differential amplifiers function together as a detector that produces an output signal at a particular output terminal 210 when, and only when, a corresponding optical source 106 (FIG. 3) is on. To see this, consider the i-th channel in FIG. 4. Since the optical power appearing at any photodetector is the sum of the optical powers arising there due to the various independent optical sources individually, only those optical sources that, when operating alone, produce unequal optical powers at a pair of photodetectors 204(i) and 206(i) can produce an output signal at output terminal 210(i). Suppose for the moment then that only a single optical source 106(j) is on.

Each X-coupler 226, except for a possible phase shift and slight attenuation of each of its two inputs and each of its two outputs, has the coupling matrix $$\frac{1}{\sqrt{2}}\begin{bmatrix} 1 & 1 \\ 1 & -1 \end{bmatrix}$$

A coupler with this ideal coupling matrix produces unequal power at its two outputs exactly when the optical signals on its two inputs are (in any amount) mutually coherent. Any output phase shifts introduced by the X-couplers are irrelevant in the system of FIG. 4, because the photodetectors are insensitive to phase. Compensation for the small X-coupler input and output attenuation will not be necessary in most applications. If compensation is deemed necessary, X-coupler output attenuations are easily compensated for by compensating the photodetector conversion gains, and X-coupler input attenuations can be compensated for in the gain of the differential amplifier 208. Any X-coupler input phase shift can be considered to be part of the phase shift of the associated interferometer arm, and treated in the same way (discussed below). Thus the X-couplers can be treated for analysis purposes as ideal.

A signal at output terminal 210(i) due to optical source 106(j) can only arise then if the associated X-coupler input signals are mutually coherent. These coupler input signals can be mutually coherent only if there are optical paths from the optical source 106(j) to each of the two X-coupler inputs with optical path lengths that differ by less than a coherence length of the optical source. Because the transmitter interferometers themselves have path length differences that differ from each other by more than this coherence length, this mutual coherence condition can be met only if the source 106(j) is the one source whose transmitter path length difference matches the path length difference of the receiver interferometer 202(i), that is, if i equals j. Thus, the output signal at each output terminal can respond only to optical power from a single optical source in the transmitter.

Now consider the actual amount of optical power at photodetectors 204(i) and 206(i) due to a single optical source 106(j). Except for losses associated with power combiners or long waveguides, essentially all of the power input to waveguide 120(j) arrives at the photodetectors 204 and 206. This power is distributed equally among the receiver channels. As discussed above, the two waveguides 230(i) and 232(i) will have the i-th receive channel's share of the power split equally between them if i is not equal to j. If i is equal to j, the powers in waveguides 230(i) and 232(i) are modified by the factors $1+0.5\cos\theta$ and $1-0.5\cos\theta$, respectively, where differential phase shift $\theta$ is the difference between the phase shifts of the two paths from optical source 106(j) to X-coupler 226(i) that have a path length difference of less than the coherence length of source 106(j). Ideally, this path length difference is 0, and so $\theta$ is also 0. As a practical matter, there will be differential phase shift due to imperfect component fabrication, and it may be necessary to provide a small compensating phase shift in one of the interferometer arms 222(i) or 224(i). This can be done with a voltage applied across a pair of electrodes similar to electrodes 78 shown in FIG. 2. Once $\theta$ has been made a multiple of $2\pi$, by whatever means, photodetector 204(i) has its power increased by 50 percent, and thus photodetector 206(i) has its power decreased by 50 percent, relative to the power levels when i is unequal to j, or when $\cos\theta$ is equal to 0. Since $\theta$ is a differential phase shift, it is not affected by phase shifts in common portions of the two paths. Thus, phase shifts are irrelevant everywhere except in the interferometers 102 and 202.

Figure 5:
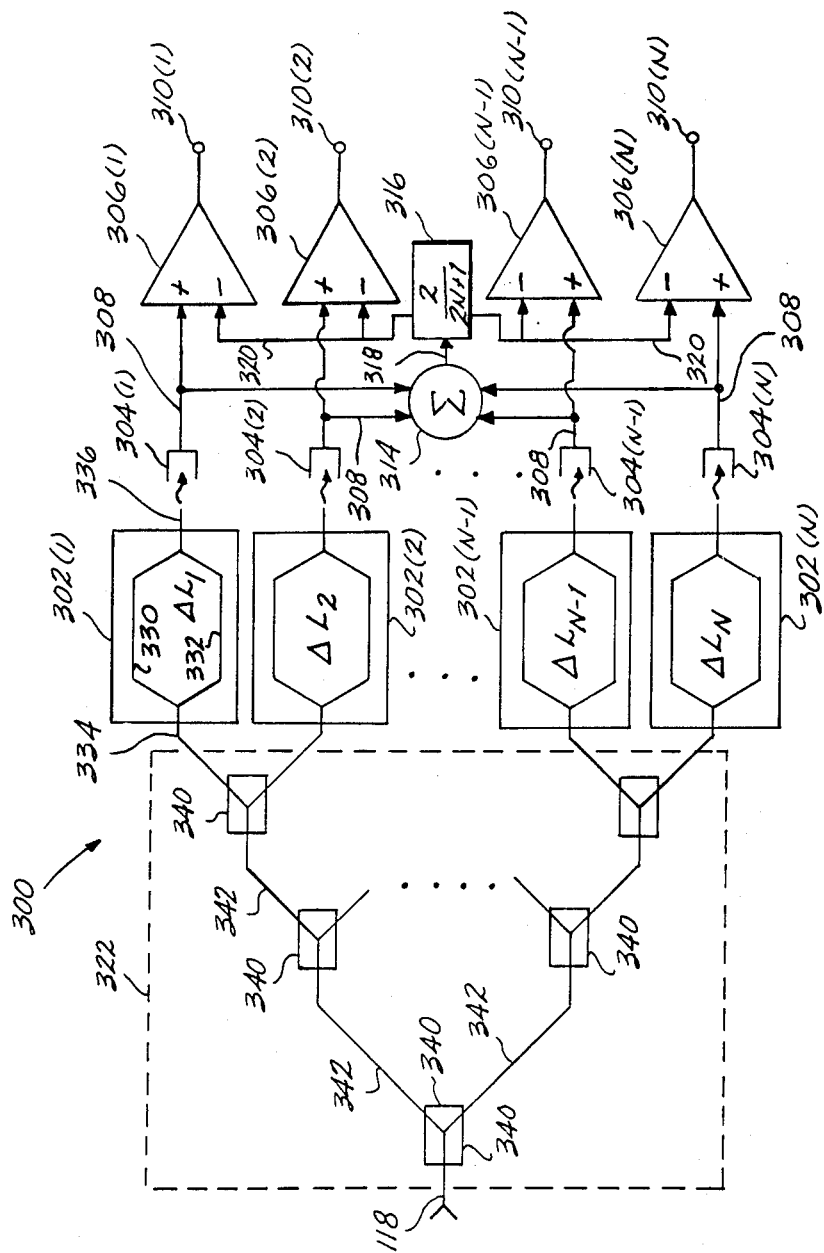
FIG. 5 is a schematic diagram of a second preferred embodiment of the receiver.

A second embodiment of an N channel receiver in accordance with the present invention is set forth in FIG. 5. Receiver 300 includes N unequal arm length Mach-Zehnder interferometers 302(1)–302(N). Associated with each interferometer 302 is a photodetector 304 and a differential amplifier 306, the photodetector electrical output signal being connected to the noninverting input of the differential amplifier by line 308. The output of the differential amplifier is connected to output terminal 310. The photodetector output signals on lines 308 are input to summing junction 314 that sums such signals to produce a sum signal on line 318 that is input to scaling circuit 316. The scaling circuit scales the signal on line 318 by the factor $2/(2N+1)$, N being the number of channels, and the resulting scaled reference signal is then input to the inverting input of each differential amplifier by lines 320. The receiver also includes signal demultiplexer 322 that comprises power splitters 340 and optical waveguides 342. The signal demultiplexer has the same properties as (and may be identical to) demultiplexer 212 shown in FIG. 4.

Receiver interferometers 302 have path length differences $\Delta L_1-\Delta L_N$ that are identical, to within the associated source coherence lengths, to the path length differences of transmitter interferometers 102. Receiver interferometers 302 may in fact be identical to transmitter interferometers 102, and fabricated using identical masks. In any event, each receiver interferometer 302 includes first arm 330 and second arm 332, input waveguide 334 and output waveguide 336. It can be shown that the optical power on output waveguide 336 is increased by a factor of fifty percent when the receiver interferometer is illuminated by light that has passed through the corresponding transmitter interferometer, relative to illumination by the same amount of light that is incoherent or that has passed through a non-matching transmitter interferometer. Thus, when the output of each photodetector 304 has a reference signal subtracted from it, the reference signal being equal to the sum of the photodetector outputs scaled by the factor $2/(2N+1)$, the photodetector output will substantially exceed the scaled sum if and only if the corresponding transmitter interferometer is active, i.e., only if an input signal is present at the corresponding input terminal 104. The signals at output terminals 310 therefore match the signals provided at input terminals 104.

While the preferred embodiments of the invention have been described, variations will be apparent to those skilled in the art. Accordingly, the scope of the invention is not limited to the specific described embodiments, but is instead to be determined by reference to the following claims.

The embodiments of the invention in which an exclusive property or privilege is claimed are defined as follows:

1. A coherence multiplexed optical signal transmission system, comprising:
    a plurality of optical sources, each source having a coherence length and including means for generating an optical input signal and means for modulating the amplitude of the input signal;
    an optical bus;
    a plurality of transmitter interferometers, one transmitter interferometer being associated with each source, each transmitter interferometer having first and second transmitter arms having an optical path length difference therebetween, each transmitter interferometer further including means for coupling optical radiation from the associated source into the transmitter arms, the optical path length difference between the first and second transmitter arms of each transmitter interferometer being greater than the coherence length of the associated source and different from the optical path length differences of all other transmitter interferometers by an amount greater than the coherence length of each source;
    multiplexing means for receiving optical radiation from the transmitter arms of the transmitter interferometers, and for combining the optical radiation onto the bus;
    a plurality of receiver interferometers, each receiver interferometer having first and second receiver arms having an optical path length difference therebetween, the optical path length difference between the receiver arms of each receiver interferometer being equal to the optical path length difference between the transmitter arms of an associated transmitter interferometer to within the coherence length of the associated source;
    demultiplexing means for coupling optical radiation from the bus into both arms of each receiver interferometer; and
    detection means coupled to each receiver interferometer, the detection means comprising an output terminal associated with each receiver interferometer and means for producing, for each receiver interferometer, an electrical output signal at the associated output terminal when the optical radiation coupled into the receiver interferometer includes a component that has passed through a transmitter interferometer having an optical path length difference equal to the optical path length difference of the receiver interferometer, to within the coherence length of the associated source.

2. The signal transmission system of claim 1, wherein the detection means comprises:
    coupling means associated with each receiver interferometer, each coupling means comprising a pair of input ports for receiving a pair of first signals, a pair of output ports for producing a pair of second signals, and means for producing second signals of different optical powers only when a component of one of the first signals is coherent with respect to a component of the other first signal, each coupling means having its input ports connected to the first and second receiver arms of the associated receiver interferometer; and signal processing means associated with each receiver interferometer, each signal processing means comprising first and second photodetectors connected to receive optical radiation from the first and second output ports of the associated coupling means, the first and second photodetectors producing corresponding first and second electrical photodetector signals, and differencing means for producing an output signal on the associated output terminal corresponding to the difference between the first and second photodetector signals.

3. The signal transmission of claim 2, wherein each coupling means comprises an X-coupler that includes means for producing the second signals such that the second signals are equal to the sum and difference of the first signals.

4. The signal transmission system of claim 1, wherein the multiplexing means comprises a binary tree structure of 2:1 couplers interconnected by optical waveguides, and the demultiplexing means comprises a binary tree structure of 1:2 splitters interconnected by optical waveguides.

5. The signal transmission system of claim 1, wherein the detection means comprises a photodetector associated with each receiver interferometer, each photodetector including means for producing an electrical photodetector signal, the detection means further comprising means for coupling optical radiation from the receiver arms of the receiver interferometer to the photodetector, reference means for providing a reference signal equal to the sum of the photodetector signals scaled by $2/(2N+1)$, N being the number of photodetector signals, and differencing means electrically coupled to each photodetector for producing an output signal on the associated output terminal proportional to the difference between the photodetector signal and the reference signal.

* * * * *